(12) United States Patent
Shang et al.

(10) Patent No.: US 11,480,450 B2
(45) Date of Patent: Oct. 25, 2022

(54) EHZ ULTRAFAST MODULATED PULSE SCANNING LASER AND DISTRIBUTED FIBER SENSING SYSTEM

(71) Applicant: Laser Institute of Shandong Academy of Science, Jining (CN)

(72) Inventors: Ying Shang, Ji'nan (CN); Chen Wang, Ji'nan (CN); Chang Wang, Ji'nan (CN); Jiasheng Ni, Ji'nan (CN); Wenan Zhao, Ji'nan (CN); Chang Li, Ji'nan (CN); Bing Cao, Ji'nan (CN); Sheng Huang, Ji'nan (CN); Yingying Wang, Ji'nan (CN); Yanbin Wu, Ji'nan (CN)

(73) Assignee: LASER INSTITUTE OF SHANDONG ACADEMY OF SCIENCE, Jining (CN)

( * ) Notice: Subject to any disclaimer, the term of this patent is extended or adjusted under 35 U.S.C. 154(b) by 590 days.

(21) Appl. No.: 16/534,567

(22) Filed: Aug. 7, 2019

(65) Prior Publication Data
US 2021/0010834 A1     Jan. 14, 2021

(30) Foreign Application Priority Data

Jul. 8, 2019    (CN) .......................... 201910611291.0

(51) Int. Cl.
*H01S 3/00*     (2006.01)
*G01D 5/353*     (2006.01)
(Continued)

(52) U.S. Cl.
CPC ..... *G01D 5/35335* (2013.01); *G01D 5/35306* (2013.01); *G01D 5/35316* (2013.01);
(Continued)

(58) Field of Classification Search
CPC .......... G01D 5/35335; G01D 5/35306; G01D 5/35316; G01D 5/35387; H01S 3/0064;
(Continued)

(56) References Cited

U.S. PATENT DOCUMENTS

| 11,231,299 B2 * | 1/2022 | Shang | G01D 5/35361 |
| 2003/0219257 A1 * | 11/2003 | Williams | H01S 3/0675 398/152 |
| 2005/0053101 A1 * | 3/2005 | Liu | H01S 3/0675 372/6 |

* cited by examiner

*Primary Examiner* — Xinning(Tom) Niu
(74) *Attorney, Agent, or Firm* — Reising Ethington, P.C.

(57) ABSTRACT

An EHz ultrafast modulated pulse scanning laser and a distributed fiber sensing system. A plurality of phase-shift gratings are engraved on a doped fiber, the phase-shift gratings having different central window wavelengths and a wavelength interval between the adjacent central window wavelengths being a preset fixed value. When a pump light emitted by a pump laser source is coupled by a wavelength division multiplexer and enters the doped fiber, a single-mode narrow-linewidth laser light having multiple wavelengths with a wavelength interval being a preset fixed value can be generated, by using the phase-shift gratings graved on the doped fiber. The ultrafast modulation is completed by using a time-domain control method based on an EOM. An internally frequency converted pulse light formed by splicing pulse lights whose frequencies linearly increase is obtained, thus forming the EHz ultrafast modulation of a distributed feedback fiber laser. In this way, a coherence length of an output laser light is increased while a frequency of the laser light is remained.

8 Claims, 4 Drawing Sheets

(51) Int. Cl.
*H01S 3/067* (2006.01)
*H01S 3/16* (2006.01)
(52) U.S. Cl.
CPC .......... *H01S 3/0064* (2013.01); *H01S 3/0085* (2013.01); *H01S 3/06716* (2013.01); *H01S 3/1608* (2013.01); *H01S 3/1616* (2013.01); *H01S 3/1618* (2013.01)
(58) Field of Classification Search
CPC .. H01S 3/0085; H01S 3/06716; H01S 3/1608; H01S 3/1616; H01S 3/1618; H01S 3/1003; H01S 3/0078; H01S 3/09415; H01S 3/2391; H01S 3/08086; H01S 3/0675
See application file for complete search history.

EHZ ULTRAFAST MODULATED PULSE SCANNING LASER AND DISTRIBUTED FIBER SENSING SYSTEM

CROSS-REFERENCE TO RELATED APPLICATIONS

The present application claims priority under 35 U.S.C 119(a) to Chinese Application No. 201910611291.0, filed on Jul. 8, 2019, which is incorporated herein by reference in its entirety.

TECHNICAL FIELD

This application relates to the field of distributed fiber sensing technologies, and in particular, to an EHz (exahertz) ultrafast modulated pulse scanning laser and a distributed fiber sensing system.

BACKGROUND

The distributed fiber sensing technology may continuously sense and measure the physical quantities to be measured, which are distributed along a length direction of a fiber, and can integrate functions of sensing and transmitting. In this way, not only the multidimensional distribution status information for space and time of the distributed environmental parameters on an entire fiber length can be continuously measured, but also the distributed measurement information can be transmitted to an information processing center in a real time manner without losses. Meanwhile, a sensing system based on the distributed fiber sensing technology has advantages of having a simple structure, being easy for use, with low signal obtaining costs in a unit length, being a good cost effective solution, and the like. Therefore, this technology is widely applied to many important military and civilian fields such as border security, pipeline leakage, seismic wave exploration, and hydrophone detection.

The distributed fiber sensing technology may be classified into two technologies of OTDR (optical time domain reflectometry) and OFDR (optical frequency domain reflectometry). Compared with the OTDR, the OFDR is significantly advantageous in an indicator of ultra-high spatial resolution, and the spatial resolution thereof depends on a linear frequency sweep range of a laser source in an OFDR system. A larger linear frequency sweep range indicates higher spatial resolution of the OFDR system. If the laser source has a sufficiently wide linear frequency sweep range, then a very high spatial resolution can be achieved. However, a detection distance of the OFDR is dependent on an optical frequency scanning duration of the laser source, and a longer optical frequency scanning duration indicates a longer detection distance. But if the optical frequency scanning duration of the laser source is longer, the corresponding frequency is lower, and thus an upper frequency limit of a signal to be tested is limited.

Therefore, as a core component of the distributed fiber sensing system, how to improve a laser to prolong the detection distance of the OFDR while enabling the distributed fiber sensing system to keep a relatively high spatial resolution is a problem that urgently needs to be resolved by a person skilled in the art.

SUMMARY

This application provides an EHz ultrafast modulated pulse scanning laser and a distributed fiber sensing system to resolve a problem that an existing distributed fiber sensing system is restricted by the important mutual constraints of high spatial resolution, long distance, and high-band.

According to a first aspect of an embodiment of this application, an EHz ultrafast modulated pulse scanning laser is provided, comprising a pump laser source, a first wavelength division multiplexer, a cascaded phase-shifted fiber grating, a second wavelength division multiplexer, a plurality of electro-optic modulators, and a controller to which the plurality of electro-optic modulators are connected, wherein an output end of the pump laser source is connected to a first end of the first wavelength division multiplexer; the cascaded phase-shifted fiber grating is composed of a plurality of phase-shift gratings that are engraved on a doped fiber, the phase-shift gratings having different central window wavelengths and a wavelength interval between the adjacent central window wavelengths being a preset fixed value, and the cascaded phase-shifted fiber grating is connected to a second end of the first wavelength division multiplexer; a third end of the first wavelength division multiplexer is connected to an end of the second wavelength division multiplexer; a laser light output from respective wavelength output channel of the second wavelength division multiplexer is transmitted to respective one of the electro-optic modulators; the controller is configured to select sequentially, within a preset duration, respective one electro-optic modulator of the plurality of electro-optic modulators according to a preset time interval.

Optionally, the laser further comprises an isolator, wherein an end of the isolator is connected to the third end of the first wavelength division multiplexer, and the other end thereof is connected to an end of the second wavelength division multiplexer.

Optionally, the laser further comprises a signal amplifier, wherein an end of the signal amplifier is connected to the third end of the first wavelength division multiplexer, and the other end thereof is connected to an end of the second wavelength division multiplexer.

Optionally, the cascaded phase-shifted fiber grating is composed of N numbers of sub cascaded phase-shifted fiber gratings connected in parallel, where N≥2, wherein the phase-shift gratings are engraved on the doped fiber of each of the sub cascaded phase-shifted fiber gratings, the phase-shift gratings having different central window wavelengths and a wavelength difference between the adjacent central window wavelengths being a first preset fixed value; and the first preset fixed value is N times of the wavelength interval between the wavelengths output by the cascaded phase-shifted fiber grating.

Optionally, the pump laser source comprises a first sub pump laser source and a second sub pump laser source, and the first wavelength division multiplexer comprises a first sub wavelength division multiplexer and a second sub wavelength division multiplexer, wherein an output end of the first sub pump laser source is connected to a first end of the first sub wavelength division multiplexer, and an output end of the second sub pump laser source is connected to a first end of the second sub wavelength division multiplexer; the cascaded phase-shifted fiber grating is connected to a second end of the first sub wavelength division multiplexer and a second end of the second sub wavelength division multiplexer, respectively; and a third end of the first sub wavelength division multiplexer or the second sub wavelength division multiplexer is connected to an end of the second wavelength division multiplexer.

Optionally, the wavelength interval between the adjacent central window wavelengths is greater than or equal to 0.2 nm.

According to a second aspect of an embodiment of this application, a distributed fiber sensing system is provided. The system includes the EHz ultrafast modulated pulse scanning laser according to the first aspect of the embodiment of this application.

Optionally, the system further comprises a circulator, a sensing fiber, a coupler, a first interference arm, a second interference arm, Faraday rotation mirrors, and a phase demodulator, wherein an output end of the EHz ultrafast modulated pulse scanning laser is connected to a first end of the circulator, a second end of the circulator is connected to the sensing fiber, and a third end of the circulator is connected to a first end of the coupler; a second end of the coupler is connected to an end of the first interference arm and an end of the second interference arm, respectively, the other end of the first interference arm and the other end of the second interference arm are connected to respective one of the Faraday rotation mirrors, respectively, and lengths of the first interference arm and the second interference arm are not equal; and the phase demodulator is connected to a third end of the coupler, and is configured to demodulate a phase change caused by a disturbance signal in the sensing fiber.

It may be seen from the foregoing embodiments that according to the EHz ultrafast modulated pulse scanning laser and the distributed fiber sensing system provided in the embodiments of this application, by means of engraving a plurality of phase-shift gratings having different central window wavelengths on a doped fiber to form a cascaded phase-shift grating, when a pump light emitted by the pump laser source is coupled by a wavelength division multiplexer and enters the cascaded phase-shift grating, a laser light having a plurality of wavelengths with a wavelength interval being a preset fixed value can be generated. Subsequently, the ultrafast modulation is performed on the foregoing laser light having the plurality of wavelengths, by using a time-domain control method based on the electro-optic modulator. Thus, an internally frequency converted pulse light formed by splicing consecutively a plurality of pulse lights whose frequencies linearly increase is obtained. In this way, the linear frequency sweep range of the laser source in the distributed fiber sensing system can be improved, thereby effectively ensuring the spatial resolution of the system. Meanwhile, based on the narrow-linewidth characteristic of the laser light output by the foregoing cascaded phase-shift grating and the ultrafast modulation of the electro-optic modulator, a coherence length of the laser light output by the laser may be increased, while a frequency of the laser light is remained. Therefore, the EHz ultrafast modulated pulse scanning laser and the distributed fiber sensing system provided in the embodiments can effectively resolve the problem that the existing distributed fiber sensing system is restricted by the important mutual constraints of high spatial resolution, long distance, and high-band.

It should be understood that the foregoing general descriptions and detailed descriptions below are exemplary and explanatory, and the present invention is not limited thereto.

BRIEF DESCRIPTION OF THE DRAWINGS

To more clearly describe the technical solutions of the present application, the accompanying drawings to be used in the embodiments are briefly illustrated below. Obviously, persons of ordinary skills in the art can also derive other accompanying drawings according to these accompanying drawings without a creative effort.

DETAILED DESCRIPTION OF THE EMBODIMENTS

Exemplary embodiments are described herein in detail, and examples thereof are shown in the accompanying drawings. When the descriptions below relate to the accompanying drawings, unless otherwise stated, same numerals in different accompanying drawings indicate same or similar elements. Implementations described in the following exemplary embodiments do not represent all implementations consistent with the present invention. On the contrary, these implementations are merely examples of a device and a method that are described in detail in the appended claims and that are consistent with some aspects of the present invention.

A laser is a core component for a distributed fiber sensing system to perform a high-precision dynamic detection, and parameters of the laser determines performance parameters of the distributed fiber sensing system. A detection range of an OFDR system is limited by a coherence length of the laser. Therefore, a novel EHz ultrafast modulated pulse scanning laser is provided in this embodiment, thus enabling the OFDR system to have a relatively high spatial resolution with a prolonged detection distance.

Figure 1:
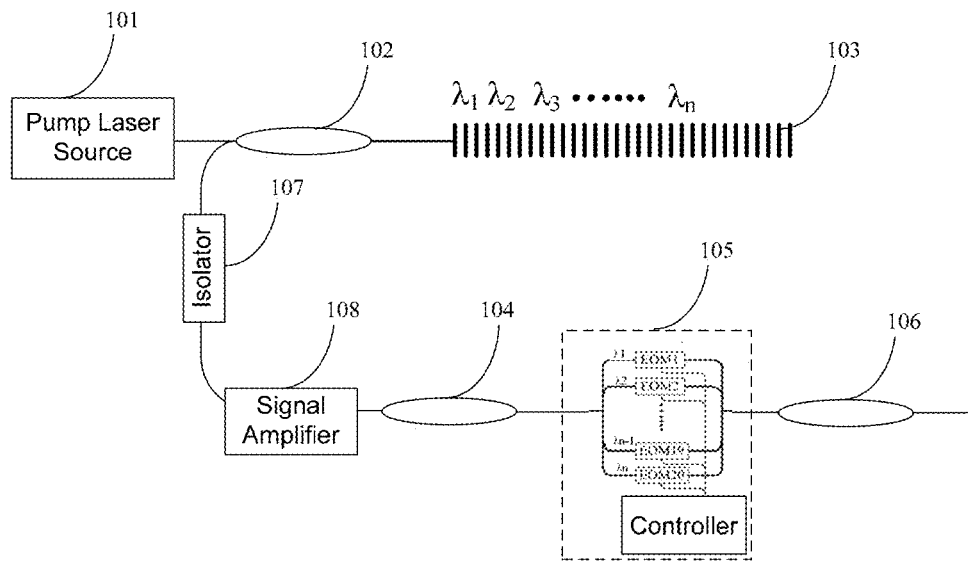
FIG. 1 is a basic schematic structural diagram of an EHz ultrafast modulated pulse scanning laser according to an embodiment of this application.

FIG. 1 is a basic schematic structural diagram of an EHz ultrafast modulated pulse scanning laser according to an embodiment of this application. As shown in FIG. 1, the laser mainly includes a pump laser source 101, a first wavelength division multiplexer 102, a cascaded phase-shifted fiber grating 103, a second wavelength division multiplexer 104, and a wavelength selective exporter 105.

In terms of connection, an output end of the pump laser source 101 is connected to a first end of the first wavelength division multiplexer 102, so that most of pump lights can be coupled into the cascaded phase-shifted fiber grating 103 through a second end of the first wavelength division multiplexer 102.

The cascaded phase-shifted fiber grating 103 is composed of a plurality of phase-shift gratings that are engraved on one doped fiber or more doped fibers connected in series, the phase-shift gratings having different central window wavelengths and a wavelength interval between the adjacent central window wavelengths being a preset fixed value. In other words, the cascaded phase-shift fiber grating 103 is composed of a plurality of phase-shift gratings that abut against each other and have a uniform periodic structure. Specifically, the cascaded phase-shifted fiber grating 103 may be prepared by using a phase mask moving method. In addition, the phase-shift gratings can be engraved on a plurality of doped fibers connected in parallel.

Compared with the conventional multi phase-shift gratings, the number of cascades in the cascaded phase-shifted fiber grating 103 designed in this embodiment does not affect a width of a transmitting spectrum. Each of the phase-shift gratings opens a transmitting window at a corresponding wavelength position, and a bandwidth is close to that in a case of a single phase shift. Thus, it has advantages of having transmitting wavelengths with good uniformity and having a stable output power, thereby facilitating a stable power of a narrow-linewidth output of a multi-wavelength laser.

Each of the phase-shift gratings in the cascaded phase-shifted fiber grating 103 can ensure, by using an ultra-narrow band transmitting peak thereof, that in a resonated laser cavity only a single longitudinal mode is existed, so as to obtain stable characteristics of a single-mode narrow-linewidth laser light. In this way, the cascaded phase-shifted fiber grating 103 can be excited by the pump laser source 101 to output a plurality of narrow-linewidth laser signals. For example, in this embodiment, twenty phase-shift gratings are engraved on one erbium doped fiber. The wavelength interval between the adjacent central window wavelengths is 0.2 nm, that is, a distance between the respective central window wavelengths $\lambda_1, \lambda_2, \lambda_3, \lambda_4, \lambda_5, \lambda_6, \ldots, \lambda_{19}$, and $\lambda_{20}$ is 0.2 nm. In this way, laser lights that have a fixed wavelength difference of 0.2 nm and a wavelength range of 1548 nm~1551.8 nm may be formed in a frequency domain. It should be noted that the foregoing wavelength interval of the phase-shift gratings is not limited to 0.2 nm, and may be any other values. However, because each of the phase-shift gratings has a bandwidth in the wavelength, in order to avoid overlapping, the wavelength interval is set to be greater than or equal to 0.2 nm in this embodiment.

Further, the laser lights output by the cascaded phase-shifted fiber grating 103 are output to the second wavelength division multiplexer 104 through a third end of the first wavelength division multiplexer 102. By using the second wavelength division multiplexer 104, light signals with different wavelengths can be transmitted in different optical channels simultaneously, without interfering with each other. In addition, in this embodiment, an isolator 107 is further disposed between the first wavelength division multiplexer 102 and the second wavelength division multiplexer 104. In this way, the laser lights output by the first wavelength division multiplexer 102 can merely be unidirectionally transmitted, in a fiber path, along an output direction of the laser lights, thereby effectively preventing the backward reflection and scattering effects from affecting the output stability of the laser, or preventing the feedback lights from damaging the laser after being input to the doped fiber through the wavelength division multiplexer.

In this embodiment, a signal amplifier 108 is further disposed between the first wavelength division multiplexer 102 and the second wavelength division multiplexer 104, so as to amplify the optical signals. An end of the signal amplifier 108 is connected to an output end of the isolator 107, and the other end is connected to an end of the second wavelength division multiplexer 104. If the isolator 107 is not disposed, an end of the signal amplifier 108 may be connected to the third end of the first wavelength division multiplexer 102. Specifically, depending on the wavelengths of the laser lights output by the cascaded phase-shifted fiber grating 103, the signal amplifier 108 may be an erbium doped fiber amplifier, a ytterbium doped fiber amplifier, or the like.

The wavelength selection exporter 105 in this embodiment includes a plurality of electro-optic modulators (EOM) and a controller to which the plurality of EOMs are connected. The laser light output from respective wavelength output channel of the second wavelength division multiplexer 104 is transmitted to respective one of the EOMs. The controller outputs a control signal to control the EOMs to work, so as to achieve an output with a certain wavelength, that is, within a preset duration, respective one EOM of the plurality of EOMs is sequentially selected according to a preset time interval, so as to form a sequence of wavelengths with a fixed time interval in a time domain. In this way, ultrafast modulation is performed on the foregoing laser lights having the plurality of wavelengths, by using a time-domain control method based on the EOMs. Thus, an internally frequency converted pulse light formed by splicing consecutively a plurality of pulse lights whose frequencies linearly increase is obtained.

For example, when the control signal output by the controller is at a low level, the EOM does not output; and when the control signal is at a high level, the EOM outputs. Assuming that the second wavelength division multiplexer 104 outputs laser lights having twenty wavelengths, and each of the wavelength output channels is correspondingly connected to respective one of the EOMs. The controller controls, in a duration of 0~5 ns, a corresponding channel ctl1 of a laser light having a first wavelength to be at a high level, and in a duration of 5~10 ns, controls a second channel ctl2 to be at a high level, and so on. In this way, the laser lights having twenty wavelengths can be arranged in a pulse width of 100 nanoseconds at an equal time interval, so as to form the EHz ultrafast modulation of the laser.

It should be noted that the foregoing wavelength selection exporter 105 is not limited to a modulation manner of the electro-optical modulators and the controller, and may be any other manners, as long as during the preset duration, the laser lights having plurality of wavelengths, which are output by the second wavelength division multiplexer 104, can be selected to be sequentially output according to a preset time interval, so as to form a sequence of wavelengths with a fixed time interval. For example, the modulation manner may alternatively be acousto-optic modulation, but the electro-optic modulation manner has an advantage of having a faster modulation frequency. In addition, the doped fiber in this embodiment is an active fiber obtained by doping various rare earth ions in the fiber base material, and may be an erbium (Er) doped fiber, a ytterbium (Yb) doped fiber, or a thulium (Tm) doped fiber. The pump source is a semiconductor laser, of which a center wavelength of an output laser light matches with an absorption wavelength of the doped fiber. Correspondingly, a center wavelength of the erbium (Er) doped fiber is 980 nm or 1480 nm, a center wavelength of the ytterbium (Yb) doped fiber is 915 nm or 975 nm, and a center wavelength of the thulium (Tm) doped fiber is 793 nm or 1560 nm. Certainly, the pump source may alternatively be other laser or laser diode that can emit the required pump lights.

Further, in this embodiment, in order to enable that the internally frequency converted pulse light output by the wavelength selection exporter 105 can be transmitted in one fiber, a third wavelength division multiplexer 106 is disposed at an output end of the wavelength selection exporter 105. The wavelength interval of the laser lights output by the cascaded phase-shifted fiber grating 103 is relatively short, and therefore, in this embodiment, the second wavelength division multiplexer 104 and the third wavelength division multiplexer 106 may be a dense wavelength division multiplexer.

The laser provided in this embodiment may output the internally frequency converted pulse light formed by splicing a plurality of pulse lights whose frequencies linearly increase. Therefore, by applying the laser to a distributed fiber sensing system, the linear frequency sweep range of the laser source in the distributed fiber sensing system can be effectively improved, thus further ensuring the spatial resolution of the OFDR system. Meanwhile, based on the narrow-linewidth characteristic of the laser lights output by the foregoing cascaded phase-shift grating and the ultrafast modulation of the electro-optic modulator, a coherence length of the laser light output by the laser may be increased, while the frequency of the laser light is remained. Therefore, the EHz ultrafast modulated pulse scanning laser provided in this embodiment can effectively resolve a problem that the existing distributed fiber sensing system is restricted by the important mutual constraints of high spatial resolution, long distance, and high-band.

Figure 2:
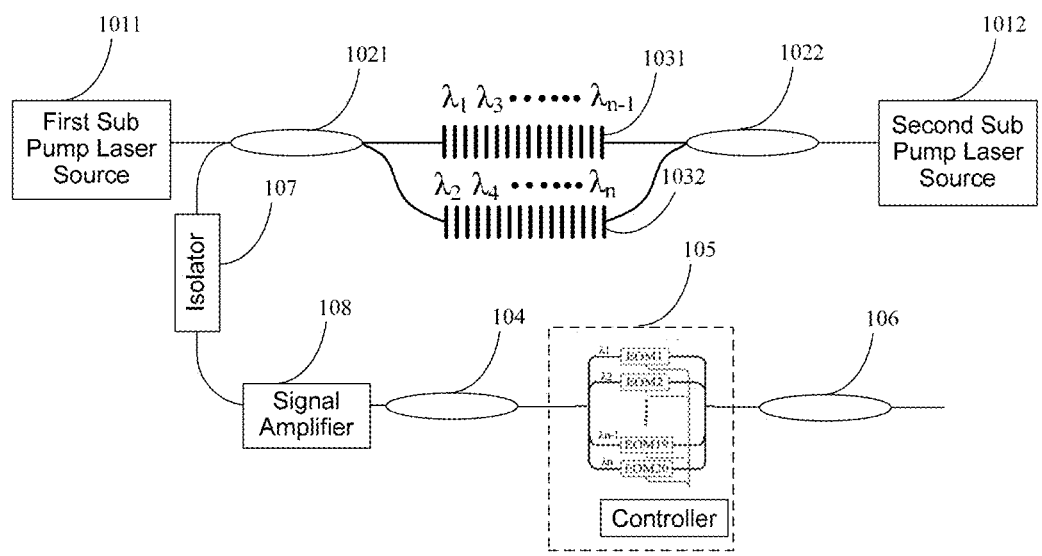
FIG. 2 is a basic schematic structural diagram of an EHz ultrafast modulated pulse scanning laser according to another embodiment of this application.

FIG. 2 is a basic schematic structural diagram of an EHz ultrafast modulated pulse scanning laser according to another embodiment of this application. As shown in FIG. 2, the EHz ultrafast modulated pulse scanning laser in this embodiment mainly differs from the EHz ultrafast modulated pulse scanning laser provided in the first embodiment in that, the cascaded phase-shifted fiber grating 103 in this embodiment is composed of a plurality of phase-shift gratings that have different central window wavelengths, which are engraved on two doped fibers connected in parallel. That is, a first cascaded phase-shifted fiber grating 1031 and a second cascaded phase-shifted fiber grating 1032 are included.

For example, ten phase-shift gratings with an wavelength interval of 0.4 nm may be engraved on an erbium doped fiber of the first cascaded phase-shifted fiber grating 1031, and corresponding output wavelengths are $\lambda_1, \lambda_3, \lambda_5, \ldots,$ and $\lambda_{19}$; and ten phase-shift gratings with an wavelength interval of 0.4 nm may be engraved on an erbium doped fiber of the second cascaded phase-shifted fiber grating 1032, and corresponding output wavelengths are $\lambda_2, \lambda_4, \lambda_6, \ldots,$ and $\lambda_{20}$. In this way, the wavelength interval of the corresponding phase-shift gratings on the two erbium doped fibers are 0.2 nm, that is, a distance between respective $\lambda_1, \lambda_2, \lambda_3, \lambda_4, \lambda_5, \lambda_6, \ldots, \lambda_{19},$ and $\lambda_{20}$ is 0.2 nm. Two erbium doped fibers are connected in parallel to form twenty distributed feedback laser wavelengths. In this way, the overlapping in wavelength may be avoided by means of a parallel connection, thus further reducing the output wavelength interval.

It should be noted that the foregoing cascaded phase-shifted fiber grating 103 is not limited to a manner of connecting two cascaded phase-shifted fiber gratings in parallel, and may be formed by any quantity of cascaded phase-shifted fiber gratings. In addition, the quantity of the phase-shift gratings engraved on the doped fiber of the respective cascaded phase-shifted fiber gratings is not limited to a same value, as long as the wavelength difference between the adjacent central window wavelengths of the phase-shift gratings engraved on the respective doped fibers is a first preset fixed value, and the first preset fixed value is N times of the wavelength interval of the wavelengths output by the cascaded phase-shifted fiber grating 103, where N is the quantity of the cascaded phase-shifted fiber gratings.

Further, in order to enable the pump laser source 101 to provide sufficient pump energy, thus generating a narrow-linewidth laser light with more stable power and a low linewidth drift rate, the pump laser source 101 in this embodiment includes a first sub pump laser source 1011 and a second sub pump laser source 1012. The first wavelength division multiplexer 102 includes a first sub wavelength division multiplexer 1021 and a second sub wavelength division multiplexer 1022. An output end of the first sub pump laser source 1011 is connected to a first end of the first sub wavelength division multiplexer 1021. An output end of the second sub pump laser source 1012 is connected to a first end of the second sub wavelength division multiplexer 1022. The cascaded phase-shifted fiber grating 103 is connected to a second end of the first sub wavelength division multiplexer 1021 and a second end of the second sub wavelength division multiplexer 1022, respectively. A third end of the first sub wavelength division multiplexer 1021 or the second sub wavelength division multiplexer 1022 is connected to an end of the second wavelength division multiplexer 104.

Based on the concept of the foregoing EHz ultrafast modulated pulse scanning laser, this embodiment further provides a distributed fiber sensing system that includes the EHz ultrafast modulated pulse scanning laser according to any one of the foregoing embodiments.

Further, aiming at a problem that at present, despite that performing static measurements by using the OFDR technology is relatively mature, there is no relatively complete system to measure a high-band disturbance signal, this embodiment further provides a distributed fiber sensing system that can demodulate the phase information of the disturbance signal.

Figure 3:
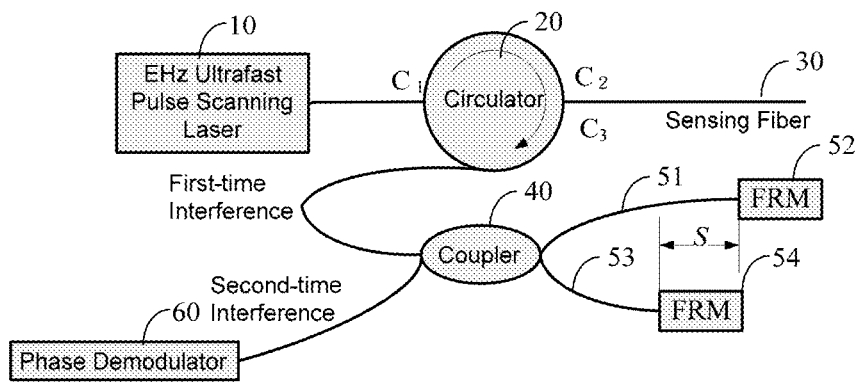
FIG. 3 is a basic schematic structural diagram of a distributed fiber sensing system according to an embodiment of this application.

FIG. 3 is a basic schematic structural diagram of a distributed fiber sensing system according to an embodiment of this application. As shown in FIG. 3, the system includes an EHz ultrafast modulated pulse scanning laser 10, a circulator 20, a sensing fiber 30, a coupler 40, a first interference arm 51, a second interference arm 53, Faraday rotation mirrors 52 and 54, and a phase demodulator 60.

A C1 port of the circulator 20 is connected to an output end of the EHz ultrafast modulated pulse scanning laser 10, a C2 port of the circulator 20 is connected to the sensing fiber 30, and a C3 port of the circulator 20 is connected to a first end of the coupler 40. A second end of the coupler 40 is connected to an end of first interference arm 51 and an end of the second interference arm 53, respectively. The other end of the first interference arm 51 and the other end of the second interference arm 53 are connected to one Faraday rotation mirror, respectively, and lengths of the first interference arm 51 and the second interference arm 53 are not equal. The phase demodulator 60 is connected to a third end of the coupler 40, and is configured to demodulate a phase change caused by a disturbance signal in the sensing fiber 30. In this embodiment, a structure formed by the first interference arm 51, the second interference arm 53, the Faraday rotation mirrors, and the phase demodulator 60 is referred to as an unbalanced Michelson interferometer. In this embodiment, a rotation angle of the Faraday rotation mirror (FRM) is set to 90°, but is not limited this value. In this way, an optical signal can be transmitted, and the polarization influence may be eliminated as well.

In this embodiment, the waveform characteristics of a Rayleigh scattering light that is received at any time by the system, is described based on a one-dimensional pulse response model of backward Rayleigh in a fiber. A fiber having a length of L is divided into N scattering units, where $\Delta l = L/N$ indicates a length of the scattering unit. Assuming that each scattering unit is completely independent, $\tau_0 = 2nf\Delta l/c$ is defined as unit scattering time. A light input to the sensing fiber 30 is a high-coherency pulse light that is internally frequency converted, as designed herein, which is formed by splicing consecutively k numbers of ultra short pulse lights whose frequencies fk increase linearly, where an interval between two adjacent frequencies is a fixed value $\Delta f_0$. If an optical pulse width for each frequency is $\omega$, a total pulse width is $k*\omega$. Therefore, this high-coherency pulse light that is internally frequency converted is incident from a position of $l=0$ into the sensing fiber 30, and an amplitude of a backward Rayleigh scattering signal obtained at an input end of the sensing fiber 30 may be expressed as:

$$E_{Rs}(t) = \sum_{m=1}^{N}\sum_{i=1}^{k} a_m \exp[j2\pi f_k(t-\tau_m)] rect\left(\frac{t-\tau_m}{\omega}\right) rect\left(\frac{t-\tau_m}{k\omega}\right) \quad (1)$$

In formula (1), $a_m$ represents an amplitude of the backward Rayleigh scattering at an arbitrary $m^{th}$ scattering point in the fiber; and $\tau_m$ represents a time delay at the arbitrary $m^{th}$ scattering point in the fiber, and a relationship between $\tau_m$ and a fiber length $l_m$ of the arbitrary $m^{th}$ scattering point in the fiber from the input end is:

$$\tau_m = \frac{2n_f l_m}{c} = m\frac{2n_f \Delta l}{c} = m\tau_0 \quad (2)$$

In formula (2), c represents a speed of light in vacuum, $n_f$ represents a refractive index of the fiber, and a rectangle function $$rect\left(\frac{t-\tau_m}{\omega}\right) = 1$$

when $$0 \le rect\left(\frac{t-\tau_m}{\omega}\right) \le 1, \text{ and}$$

$$rect\left(\frac{t-\tau_m}{\omega}\right) = 0$$

in other cases.

In this way, the information at a point in the fiber is described by using a backward Rayleigh scattering optical signal at a corresponding time, and variations of the scattering light can reflect the contents included in the information at this point.

Figure 4:
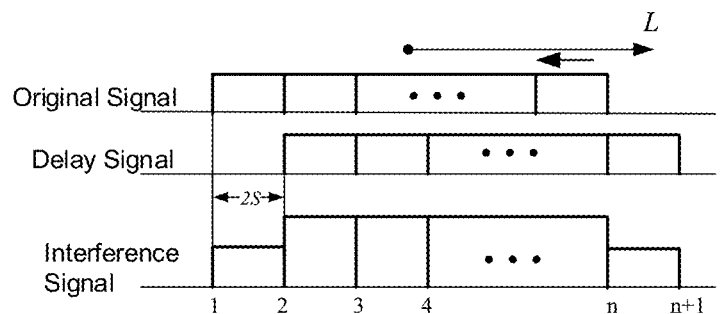
FIG. 4 is a schematic diagram of the spatial differential interference of a backward Rayleigh scattering light that passes through a Michelson interferometer in FIG. 3.

Further, the backward Rayleigh scattering light generated in the sensing fiber 30 enters, after passing through the coupler 40, the Michelson interferometer in which a length difference between the interference arms is s. When the length difference s is much smaller than a length L of the interference arm in the interferometer, in a pulse scanning cycle, interferences are sequentially occurred for the backward Rayleigh scattering light at a position where lengths of two spatially adjacent arms in the interferometer differ, this is, referred to as spatial differential interference. FIG. 4 is a schematic diagram of the spatial differential interference of the backward Rayleigh scattering light that passes through the Michelson interferometer in FIG. 3. As shown in FIG. 4, in this embodiment, a signal returned from the second interference arm 53 that is relatively shorter is referred to as an original signal, a signal returned from the first interference arm 51 is referred to as a delay signal, and an optical path difference between the original signal and the delay signal is $2n_f s$.

Assuming a delay introduced by the interferometer $\tau_s = 2n_f s/c$, an amplitude of the delay signal may be expressed as:

$$E_d(t) = \qquad (3)$$

$$\sum_{n=1}^{N}\sum_{i=1}^{k} a_n \exp[j2\pi f_k(t-\tau_n-\tau_s)] rect\left(\frac{t-\tau_n-\tau_s}{w}\right) rect\left(\frac{t-\tau_n-\tau_s}{kw}\right)$$

Figure 5:
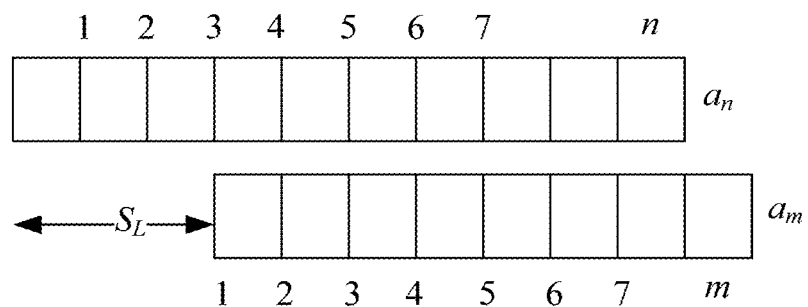
FIG. 5 is a schematic diagram of a timing correspondence between a delay signal and an original signal in FIG. 4.

FIG. 5 is a schematic diagram of a timing correspondence between the delay signal and the original signal in FIG. 4. As shown in FIG. 5, the time sequence of the delay signal is in one-to-one correspondence to that of the original signal, that is, the backward scattering optical signal incident into the interferometer. Assuming that the quantity of scattering unit points in the fiber with a length of s is $S_L$, the time sequence of the delay signal satisfies $n = m + S_L$.

Therefore, the total interference light intensity received by the interferometer may be expressed as:

$$l(t) = [E_{Rs}(t)+E_d(t)] \cdot [E_{Rs}(t)+E_d(t)]^* = \qquad (3)$$

$$\sum_{m=1}^{N}\sum_{i=m+1}^{N}\sum_{p=1}^{k} a_m a_i \cos(2\pi p\Delta f_0 w + \varphi_{mi}) rect\left(\frac{t-\tau_m}{w}\right)$$

$$rect\left(\frac{t-\tau_m}{kw}\right) rect\left(\frac{t-\tau_i}{w}\right) rect\left(\frac{t-\tau_i}{kw}\right) +$$

$$\sum_{n=1}^{N}\sum_{j=1}^{N}\sum_{p=1}^{k} a_n a_j \cos(2\pi p\Delta f_0 w + \varphi_{nj}) rect\left(\frac{t-\tau_n-\tau_s}{w}\right)$$

$$rect\left(\frac{t-\tau_n-\tau_s}{kw}\right) rect\left(\frac{t-\tau_j-\tau_s}{w}\right) rect\left(\frac{t-\tau_j-\tau_s}{kw}\right) +$$

$$2\sum_{m=1}^{N}\sum_{n=1}^{N}\sum_{p=1}^{k} a_m a_n \cos(2\pi p\Delta f_0 w + \varphi_{mns}) rect\left(\frac{t-\tau_m}{w}\right)$$

$$rect\left(\frac{t-\tau_m}{kw}\right) rect\left(\frac{t-\tau_n-\tau_s}{w}\right) rect\left(\frac{t-\tau_n-\tau_s}{kw}\right)$$

In formula (4), a multi-level difference-frequency term $2\pi p \Delta f_0 w$ is included. Meanwhile, a phase difference $\varphi_{mns} = 4\pi f n_f \Delta l(n-m)/c + 4\pi f n_f s/c$. To be specific, the phase difference is a power change of a backward scattering light at a point, which is caused by external disturbance. Therefore, the information about the position, the frequency, the intensity, and the like of an acoustic source can be obtained by measuring a variation curve of an interference signal. For example, the phase change caused by the disturbance signal in the sensing fiber 30 is demodulated by using the phase demodulator 60 that is connected to the third end of the coupler 40.

Further, according to formula (4), the total interference light intensity is performed with high-pass filtering and the difference-frequency component is taken therefrom. By using a matching filter technology developed from the microwave radar technology, a pulse compression effect can be achieved by performing a convolution on the relevant received data and a complex conjugate function that is in direct proportion to a signal waveform. Compared with a single-frequency OTDR system, the pulse width is narrowed down to 1/k of the original width, and the spatial resolution of the system finally satisfies that $$D = \frac{c}{2n_f \Delta f_0}.$$

Meanwhile, for a frequency response range, the total interference light intensity is performed with low-pass filtering and the zero-difference frequency component is taken therefrom, and the entire system can be equivalent to k numbers of OTDR systems that have different frequencies and simultaneously work in a time sequence. After the relative phase results obtained by phase demodulation are arranged in the time sequence as well, the frequency response range of the system is improved by k times as compared with the single-frequency OTDR system. Moreover, based on the output characteristic of the EHz ultrafast modulated pulse scanning laser 10, the system may be enabled to monitor simultaneously in terms of long distance, high-band signal, and high spatial resolution.

Figure 6:
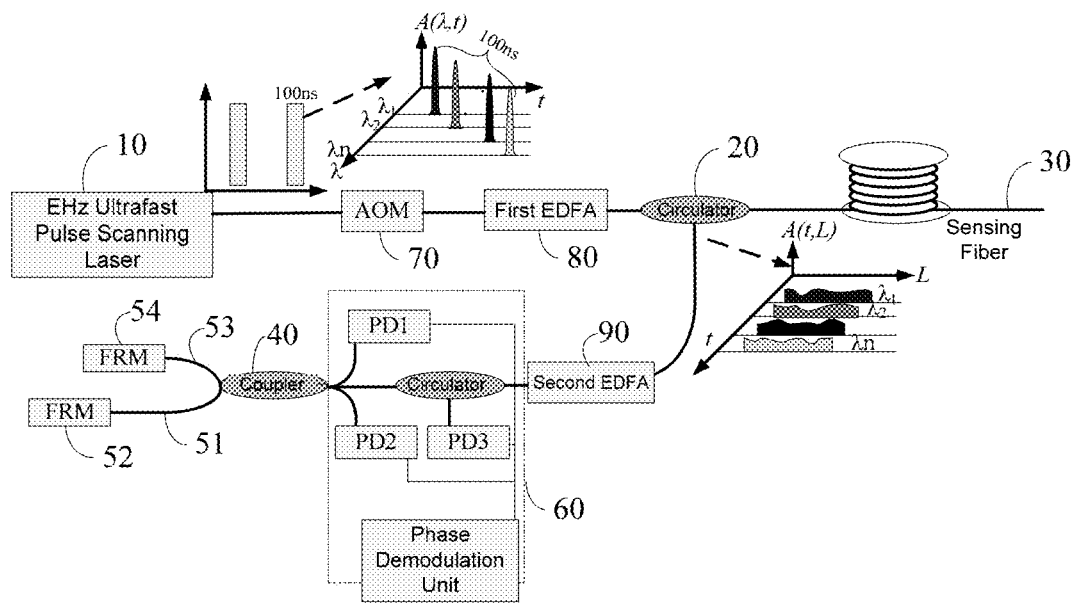
FIG. 6 is a basic schematic structural diagram of a distributed fiber sensing system according to another embodiment of this application.

Further, for the demodulation of the phase difference signal, various phase difference demodulation algorithms are provided in this embodiment. FIG. 6 is a basic schematic structural diagram of a distributed fiber sensing system according to another embodiment of this application.

As shown in FIG. 6, the EHz ultrafast modulated pulse scanning laser 10 in this embodiment is a laser based on EHz ultrafast modulated pulse scanning. The EHz ultrafast modulated pulse scanning laser is performed with further chopping processing (for example, with a pulse width of 100 ns and a scanning frequency of 20 KHz) by using an AOM (acousto-optic modulator 70), so that a laser isolation reaches 60 db. It is amplified by a first erbium doped fiber amplifier (EDFA) 80 and then enters the sensing fiber 30 after passing through the circulator 20, and the backward Rayleigh scattering signal is amplified by a second EDFA 90 and then enters the unbalanced Michelson interferometer to achieve the spatial differential interference. Finally, the phase information is demodulated by using the phase demodulator 60. The phase demodulator 60 includes three photoelectric detectors (PD1, PD2, and PD3), a circulator, and a phase demodulation unit.

Figure 7:
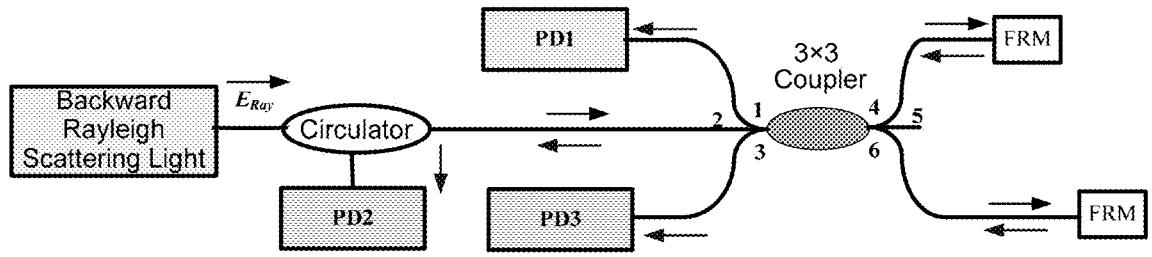
FIG. 7 is a schematic diagram of an optical path of phase demodulation of a 3×3 coupler in FIG. 6.

FIG. 7 is a schematic diagram of an optical path of phase demodulation of a 3×3 coupler 40 in FIG. 6. As shown in FIG. 7, ports 4 and 6 of the 3×3 coupler 40 are connected with two fibers with different lengths, thus an arm length difference is formed; and Faraday rotation mirrors are connected, and thus two arms of a phase-matching interferometer are formed. By means of adjusting the arm length difference of the phase-matching interferometer, it is possible to form an interference field of the backward Rayleigh scattering light in different adjacent space segments. The backward Rayleigh scattering light is incident to a port 2 of the 3×3 coupler 40 after passing through the circulator 20, and is split into two optical signals by the port 2 of the 3×3 coupler 40. One of the two optical signals enters the port 4 of the 3×3 coupler 40, and is returned to the port 4 of the 3×3 coupler 40 after passing through the first interference arm 51 and the Faraday rotation mirror 52. The other of the two optical signals enters the port 6 of the 3×3 coupler 40, and is returned to the port 6 of the coupler 40 after passing through the second interference arm 53 and the Faraday rotation mirror 54. The two lights are combined and interfered at the 3×3 coupler 40. The interfered backward Rayleigh scattering light enters the PD1 and the PD3 after passing through ports 1 and 3 of the 3×3 coupler 40, and enters the PD2 after passing through the port 2 of the 3×3 coupler 40 and the circulator 20.

The light intensity obtained by the three detectors is expressed as:

$$I_p = D + I_0 \cos[\phi(t) - (p-1) \times (2\pi/3)], p=1,2,3 \quad (5)$$

In formula (5), $\Phi(t) = \phi(t) + \psi(t)$; D represents a direct component of the interference signal; $I_0$ represents an amplitude of an alternating component of the interference signal; p represents a serial number of an optical signal received by the detector, where p=1, 2, 3; $\phi(t)$ represents a phase difference signal rad caused by the disturbance signal; and $\psi(t)$ represents a phase difference signal rad caused by ambient noises.

Figure 8:
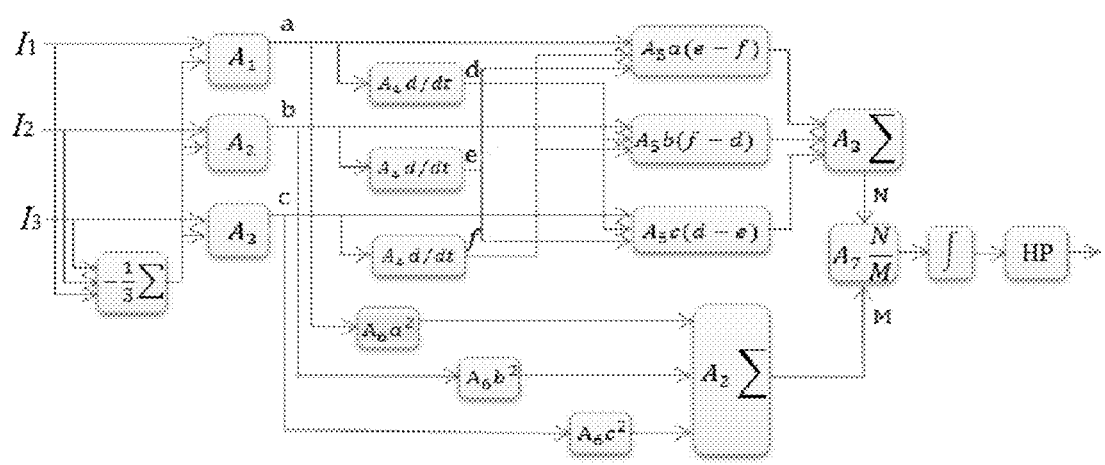
FIG. 8 is a functional block diagram of a phase demodulation algorithm based on a 3×3 coupler according to an embodiment of this application.

Subsequently, the phase demodulation is performed, by using the phase demodulation unit, on the optical signals received by the three detectors. FIG. 8 is a functional block diagram of the phase demodulation algorithm based on the 3×3 coupler according to an embodiment of this application. As shown in FIG. 8, for easy of derivation, it is assumed that $A_1 \sim A_7 = 1$.

Three light intensity signals are added together and multiplied by ⅓, and an output of a first adder is expressed as follows:

$$-\frac{1}{3}\sum_{p=1}^{3} I_p = -D \quad (6)$$

$I_1$ to $I_3$ are respectively added with −D to obtain:

$$a = I_0 \cos[\phi(t)], b = I_0 \cos[\phi(t) - 2\pi/3], \text{ and } c = I_0 \cos[\phi(t)] - 4\pi/3] \quad (7)$$

By means of eliminating a direct current term and keeping an alternating current term, differential operations are performed on a, b, and c to obtain:

$$d = -I_0 \phi'(t) \sin[\phi(t)]$$

$$e = -I_0 \phi'(t) \sin[\phi(t) - 2\pi/3]$$

$$f = -I_0 \phi'(t) \sin[\phi(t) - 4\pi/3] \quad (8)$$

Two differential signals are subtracted and then multiplied by the remaining signal, to obtain:

$$a(e-f) = \sqrt{3} I_0^2 \phi'(t) \cos^2 \phi(t)$$

$$b(f-d) = \sqrt{3} I_0^2 \phi'(t) \cos^2[\phi(t) - 2\pi/3]$$

$$c(d-e) = \sqrt{3} I_0^2 \phi'(t) \cos^2[\phi(t) - 4\pi/3] \quad (9)$$

A sum of a (e-f), b (f-d), and c (d-e) is:

$$N = a(e-f) + b(f-d) + c(d-e) = \frac{3\sqrt{3}}{2}I_0^2\varphi'(t) \quad (10)$$

Because $I_0$ varies due to influence of the system, by eliminating variations of $I_0$, a quadratic sum of the three signals is:

$$M = a^2 + b^2 + c^2 = 3/2I_0^2 \quad (11)$$

The following may be obtained from dividing formula (10) by formula (11):

$$P = N/M = \sqrt{3}\varphi'(t) \quad (12)$$

The following is output after an integral operation:

$$V_{out} = \sqrt{3}\varphi p(t) = \sqrt{3}[\phi(t) + \psi(t)] \quad (13)$$

Because $\psi(t)$ is a slow variable, the phase-change slow variable caused by the environment is eliminated by using a high-pass filter, so as to obtain the disturbance signal, such as the phase change $\phi(t)$ caused by an acoustic wave signal.

Figure 9:
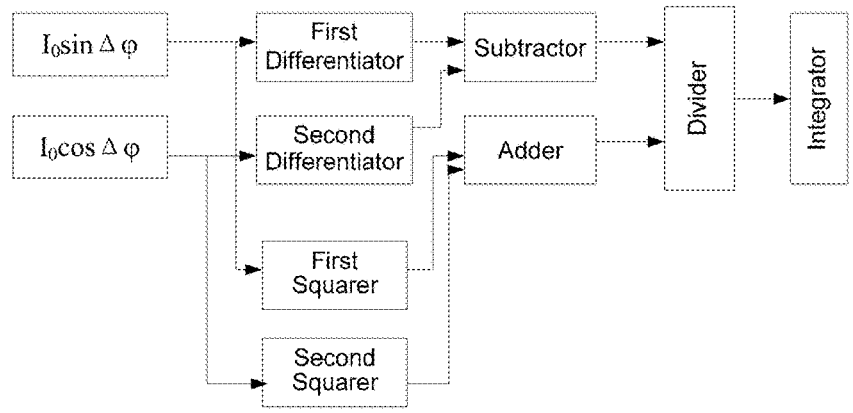
FIG. 9 is a functional block diagram of an orthogonally optimized phase demodulation algorithm of a 3×3 coupler according to an embodiment of this application.

Further, to eliminate the influence of an angle of the 3×3 coupler 40, and convert an operation of the three-path data into two-path data for operation, requirements for on-chip resources are reduced in the phase demodulation algorithm of the 3×3 coupler 40 that is based on a field programmable gate array (FPGA), thereby improving the real time operation. This embodiment further provides an improved phase demodulation algorithm of the 3×3 coupler 40. FIG. 9 is a functional block diagram of an orthogonally optimized phase demodulation algorithm of the 3×3 coupler according to an embodiment of this application. As shown in FIG. 9, in this embodiment, the known angles $\theta_1$ and $\theta_2$ of the 3×3 coupler 40 are substituted into formulas of the three original signals of the 3×3 coupler 40, to obtain:

$$\begin{aligned} I_1 &= D + I_0\cos[\phi(t)] \\ I_2 &= D + I_0\cos[\phi(t) - \theta_1] = D + I_0[\cos\phi(t)\cos\theta_1 + \sin\phi(t)\sin\theta_1] \\ I_3 &= D + I_0\cos[\phi(t) - \theta_2] = D + I_0[\cos\phi(t)\cos\theta_2 + \sin\phi(t)\sin\theta_2] \end{aligned} \quad (14)$$

A triangular transformation on formula (14) is performed to obtain:

$$\begin{bmatrix} I_1 \\ I_2 \\ I_3 \end{bmatrix} = \begin{bmatrix} 1 & 0 & 1 \\ \cos\theta_1 & \sin\theta_1 & 1 \\ \cos\theta_2 & \sin\theta_2 & 1 \end{bmatrix} \begin{bmatrix} I_0\cos\phi(t) \\ I_0\sin\phi(t) \\ D \end{bmatrix} \quad (15)$$

Two orthogonal variables $a = I_0 \cos \phi(t)$ and $b = I_0 \sin \phi(t)$ in formula (15) are solved to obtain:

$$\begin{bmatrix} I_0\cos\phi(t) \\ I_0\sin\phi(t) \\ D \end{bmatrix} = \begin{bmatrix} 1 & 0 & 1 \\ \cos\theta_1 & \sin\theta_1 & 1 \\ \cos\theta_2 & \sin\theta_2 & 1 \end{bmatrix}^{-1} \begin{bmatrix} I_1 \\ I_2 \\ I_3 \end{bmatrix} \quad (16)$$

The following may be obtained through a differential operation:

$$c = -I_0\varphi'(t)\sin\varphi(t)$$

$$d = I_0\varphi'(t)\cos\varphi(t) \quad (17)$$

The following may be obtained by multiplying and then subtracting:

$$N = ad - bc = I_0^2\varphi'(t) \quad (18)$$

The following may be obtained by squaring and then summing the two orthogonal variables:

$$M = a^2 + b^2 = I_0^2 \quad (19)$$

The following may be obtained by dividing formula (18) by formula (19):

$$P = N/M = \varphi'(t) \quad (20)$$

The following may be obtained by performing an integral operation on formula (20):

$$V_{out} = \varphi(t) + \psi(t) \quad (21)$$

Because $\psi(t)$ is a slow variable, the phase-change slow variable caused by the environment is eliminated by using a high-pass filter, so as to obtain the disturbance signal, such as the phase change $\phi(t)$ caused by an acoustic wave signal.

Figure 10:
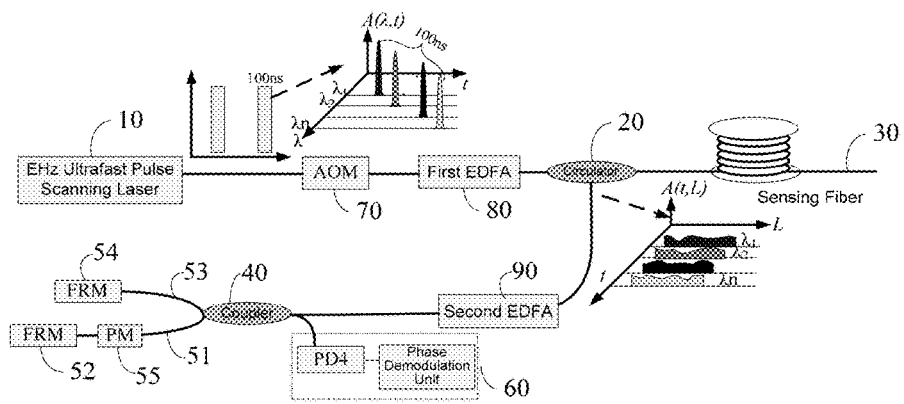
FIG. 10 is a basic schematic structural diagram of a distributed fiber sensing system according to still another embodiment of this application.

FIG. 10 is a basic schematic structural diagram of a distributed fiber sensing system according to still another embodiment of this application. As shown in FIG. 10, the distributed fiber sensing system in this embodiment mainly differs from that in the foregoing embodiment in that, a phase carrier demodulation manner is used in this embodiment. The phase demodulator 60 includes a photoelectric detector (PD4) and a phase demodulation unit. Meanwhile, a phase modulator 55 is further disposed on the first interference arm 51.

The backward Rayleigh scattering light generated by the sensing fiber 30 is incident to the coupler 40 after passing through the circulator 20, and is split into two optical signals by the first port of the 3×3 coupler 40. One of the two optical signals enters the second port of the coupler 40, and is returned to the coupler 40 after passing through the first interference arm 51 and the Faraday rotation mirror 52. The other of the two optical signals enters the third port of the coupler 40, and is returned to the coupler 40 after passing through the second interference arm 53 and the Faraday rotation mirror 54. The two optical signals are combined and interfered at the coupler 40. The interfered backward Rayleigh scattering light enters the photoelectric detector PD4 after passing through the fourth port of the coupler 40.

According to the coherence principle of light, the light intensity I of the photoelectric detector PD4 may be expressed as:

$$I = A + B\cos\Phi(t) \quad (22)$$

In formula (22): A represents an average optical power output by the interferometer; B represents an amplitude of an interference signal, where B=κA, and κ≤1 represents visibility of an interference fringe. $\Phi(t)$ represents a phase difference of the interferometer. Assuming that $\Phi(t) = C\cos\omega_0 t + \phi(t)$, formula (22) may be expressed as:

$$I = A + B\cos[C\cos\omega_0 t + \phi(t)] \quad (23)$$

In formula (22), $C\cos\omega_0 t$ represents a phase carrier, C represents an amplitude, and $\omega_0$ represents a carrier frequency; $\varphi(t) = D\cos\omega_s t + \Psi(t)$, where $D\cos\omega_s t$ represents a phase change caused by the disturbance signal in the sensing fiber 30, D represents an amplitude, $\omega_s$ represents a frequency of a sound field signal, $\Psi(t)$ represents a slow variation of an initial phase, which is caused by environmental disturbance or the like. Expanding formula (23) by using a Bessel function to obtain:

$$I = A + B\left\{\left[J_0(C) + 2\sum_{k=0}^{\infty}(-1)^k J_{2k}(C)\cos 2k\omega_0 t\right]\cos\phi(t) - \right.$$
$$\left. 2\left[\sum_{k=0}^{\infty}(-1)^k J_{2k+1}(C)\cos(2k+1)\omega_0 t\right]\sin\phi(t)\right\} \quad (24)$$

In formula (24), $J_n(m)$ represents an n-order Bessel function value under m-depth of modulation. Assuming k=0 and 1, respectively, a fundamental frequency signal and a frequency doubling signal are obtained.

Figure 11:
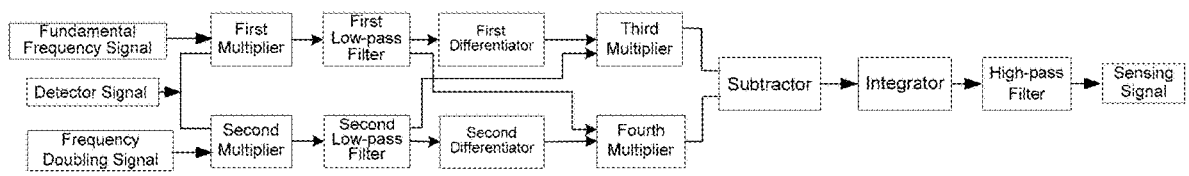
FIG. 11 is a functional block diagram of a phase carrier demodulation algorithm according to an embodiment of this application.

FIG. 11 is a functional block diagram of a phase carrier demodulation algorithm according to an embodiment of this application. As shown in FIG. 11, the phase demodulator 60, that is, a phase generated carrier (PGC) demodulation device in this embodiment includes multipliers, filters, differentiators, and an integrator. The fundamental frequency signal is multiplied with the detector signal at a first multiplier and then enters a first low-pass filter; the signal is transmitted to a first differentiator and is multiplied with a signal from a second low-pass filter, and then enters an end of a subtractor to be performed with a subtraction operation with a signal from a fourth multiplier. The frequency doubling signal is multiplied with the detector signal at a second multiplier and then enters the second low-pass filter; the signal is transmitted to a second differentiator and is multiplied with a signal from the first low-pass filtering, and then enters an end of the subtractor to be performed with a subtraction operation with a signal from a third multiplier. The two signals are simultaneously transmitted to a subtractor, and after being performed with an operation, it is transmitted to an integrator and a high-pass filter to be demodulated to obtain the sensing signals. To be specific as follows:

The detector signal I that is output by the interferometer and is expanded by using the Bessel function is multiplied with the fundamental frequency signal (with an amplitude of G) and the frequency doubling signal (with an amplitude of H). To overcome the blanking and distortion phenomena of the signal due to fluctuation of an external disturbance signal, the differential-cross multiply (DCM) is performed on the two signals. After being performed with a differential amplification and an integral operation, it is converted as:

$$B^2 GHJ_1(C)J_2(C)\varphi(t) \quad (25)$$

The following may be obtained by substituting $\varphi(t)=D\cos\omega_s t+\Psi(t)$ into formula (25):

$$B^2 GHJ_1(C)J_2(C)[D\cos\omega_s t+\Psi(t)] \quad (26)$$

It may be learned that a signal after being performed with an integration operation includes $D\cos\omega_s t$, which is a signal to be tested, and the external environment information. The latter is usually a slow-varying signal, and has a very large amplitude, and thus may be filtered by a high-pass filter. A final output of the system is:

$$B^2 GHJ_1(C)J_2(C)D\cos\omega_s t \quad (27)$$

The phase-change signal $D\cos\omega_s t$ that is caused by the disturbance signal in the sensing fiber 30 may be solved from formula (27).

Embodiments in this specification are all described in a progressive manner. For same or similar parts between the embodiments, reference may be made to each other. For each embodiment, emphasis is put on differences between this embodiment and other embodiments.

A person skilled in the art would easily conceive of other implementation solutions of the present invention after considering the specification and practicing the invention invented herein. This application is intended to cover any variations, uses, or adaptive changes of the present invention. These variations, uses, or adaptive changes follow the general principle of the present invention and include the common general knowledge or common technical solutions in this technical filed of the present invention. The specification and the embodiments are merely considered as exemplary, and the actual scope and spirit of the present invention are indicated in the following claims.

It should be understood that the present invention is not limited to the exact structure that is described above and is shown in the figures, and various modifications and changes can be made thereto, without departing from the scope thereof. The scope of the present invention is merely limited by the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An EHz ultrafast modulated pulse scanning laser, wherein the laser comprises a pump laser source, a first wavelength division multiplexer, a cascaded phase-shifted fiber grating, a second wavelength division multiplexer, a wavelength selective exporter, and a controller to which the wavelength selective exporter is connected, wherein
an output end of the pump laser source is connected to a first end of the first wavelength division multiplexer;
the cascaded phase-shifted fiber grating is composed of a plurality of phase-shift gratings that are engraved on a doped fiber, the phase-shift gratings having different central window wavelengths and a wavelength interval between the adjacent central window wavelengths being a preset fixed value, and the cascaded phase-shifted fiber grating is connected to a second end of the first wavelength division multiplexer;
a third end of the first wavelength division multiplexer is connected to an end of the second wavelength division multiplexer;
the wavelength selective exporter comprises a plurality of electro-optic modulators respectively connected to the controller;
a laser light output from respective wavelength output channel of the second wavelength division multiplexer is transmitted to respective one of the electro-optic modulators, so as to output a sequence of wavelengths with a fixed time interval in a time domain, such that an internally frequency converted pulse light formed by splicing consecutively a plurality of pulse lights whose frequencies linearly increase is obtained; and
the controller is configured to output a control signal at a high level sequentially, within a preset duration, to respective one electro-optic modulator according to a preset time interval, and to control the respective one electro-optic modulator to work based on the control signal to perform an EHz ultrafast modulation on the laser lights.

2. The EHz ultrafast modulated pulse scanning laser according to claim 1, wherein the laser further comprises an isolator, wherein an end of the isolator is connected to the third end of the first wavelength division multiplexer, and the other end of the isolator is connected to an end of the second wavelength division multiplexer.

3. The EHz ultrafast modulated pulse scanning laser according to claim 1, wherein the laser further comprises a signal amplifier, wherein
an end of the signal amplifier is connected to the third end of the first wavelength division multiplexer, and the other end of the signal amplifier is connected to an end of the second wavelength division multiplexer.

4. The EHz ultrafast modulated pulse scanning laser according to claim 1, wherein the cascaded phase-shifted fiber grating is composed of N numbers of sub cascaded phase-shifted fiber gratings connected in parallel, where N>2, wherein
the phase-shift gratings are engraved on the doped fiber of each of the sub cascaded phase-shifted fiber gratings, the phase-shift gratings having different central window wavelengths and a wavelength difference between the adjacent central window wavelengths being a first preset fixed value; and
the first preset fixed value is N times of the wavelength interval between the wavelengths output by the cascaded phase-shifted fiber grating.

5. The EHz ultrafast modulated pulse scanning laser according to claim 1, the pump laser source comprises a first sub pump laser source and a second sub pump laser source, and the first wavelength division multiplexer comprises a first sub wavelength division multiplexer and a second sub wavelength division multiplexer, wherein
an output end of the first sub pump laser source is connected to a first end of the first sub wavelength division multiplexer, and an output end of the second sub pump laser source is connected to a first end of the second sub wavelength division multiplexer;
the cascaded phase-shifted fiber grating is connected to a second end of the first sub wavelength division multiplexer and a second end of the second sub wavelength division multiplexer, respectively; and
a third end of the first sub wavelength division multiplexer or the second sub wavelength division multiplexer is connected to an end of the second wavelength division multiplexer.

6. The EHz ultrafast modulated pulse scanning laser according to claim 1, wherein the wavelength interval between the adjacent central window wavelengths is greater than or equal to 0.2 nm.

7. A distributed fiber sensing system, wherein the system comprises the EHz ultrafast modulated pulse scanning laser according to claim 1.

8. The distributed fiber sensing system according to claim 7, wherein the system further comprises a circulator, a sensing fiber, a coupler, a first interference arm, a second interference arm, Faraday rotation mirrors, and a phase demodulator, wherein
an output end of the EHz ultrafast modulated pulse scanning laser is connected to a first end of the circulator, a second end of the circulator is connected to the sensing fiber, and a third end of the circulator is connected to a first end of the coupler;
a second end of the coupler is connected to an end of the first interference arm and an end of the second interference arm, respectively, the other end of the first interference arm and the other end of the second interference arm are connected to respective one of the Faraday rotation mirrors, respectively, and lengths of the first interference arm and the second interference arm are not equal; and
the phase demodulator is connected to a third end of the coupler, and is configured to demodulate a phase change caused by a disturbance signal in the sensing fiber.

* * * * *